G. A. DONAHUE.
SHAFT COLLAR.
APPLICATION FILED JULY 2, 1908.

922,463.

Patented May 25, 1909.

Witnesses:
Jas. E. Hutchinson.
C. A. Krey.

Inventor:
George A. Donahue,
By _____ Attorneys.

UNITED STATES PATENT OFFICE.

GEORGE A. DONAHUE, OF WILMINGTON, DELAWARE.

SHAFT-COLLAR.

No. 922,463.   Specification of Letters Patent.   Patented May 25, 1909.

Application filed July 2, 1908. Serial No. 441,562.

*To all whom it may concern:*

Be it known that I, GEORGE A. DONAHUE, a citizen of the United States, residing at Wilmington, in the county of Newcastle and State of Delaware, have invented certain new and useful Improvements in Shaft-Collars, of which the following is a specification, reference being had therein to the accompanying drawing.

This invention relates to improvements in shaft collars.

The primary object of the invention is the provision of a collar designed for attachment to the ends of shafting to retain other parts on said shafting in place, the characteristics of a convenient embodiment of the invention residing in the simplicity of the device, its cheapness of manufacture, ready application of the same to the shaft, its high degree of efficiency, and last and more particularly, the absence of any protruding pins or angular or pointed parts whereon the clothing of the workmen or others may be caught. With reference to the last mentioned feature of the invention, it is a matter of common knowledge that in many instances, where the usual shaft collars are employed in factories, serious injury has very frequently resulted from the catching of the clothing of the machine operator or visitors upon the projecting heads of securing bolts or screws fastening the collars to the ends of pulley shafting. This danger is substantially removed by the present invention.

The novel details in the construction and arrangement of the parts of my device will be apparent from the detail description hereinafter contained, when read in connection with the accompanying drawings forming a part hereof and wherein the before mentioned embodiment of my invention is illustrated.

Figure 1:
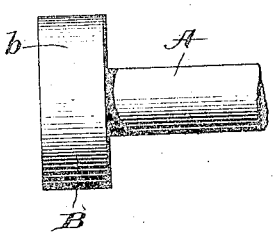
Figure 2:
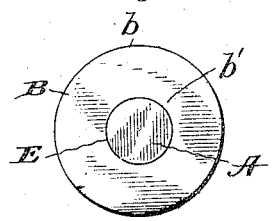
Figure 3:
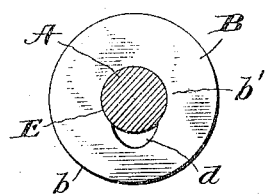
Figure 4:
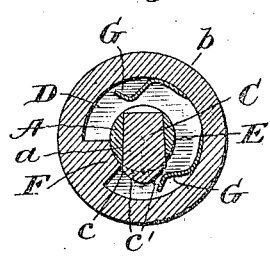
Figure 5:
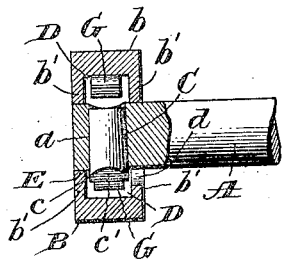

In the drawings, Figure 1 is an elevation of a section of shafting having the collar applied thereto, Fig. 2 is an end view, Fig. 3 is a similar view looking at the opposite side of the collar, Fig. 4 is a sectional view taken through the periphery of the collar, and Fig. 5 is a sectional view longitudinally of the shaft.

Referring more specifically to the drawings, wherein like reference characters designate corresponding parts in the several views, A represents the end of a shaft which may be considered a pulley shaft on which a loose pulley, or other equivalent part is desired to be held against axial movement on the shaft, by means of the collar B.

In the shaft A, I provide an aperture $a$ extending therethrough and in this aperture removably insert what I will term a stop pin C, having a head $c$ at one end preventing the entrance of the pin entirely within the aperture $a$, the opposite edges of the pin circumferentially of the shaft being tapered as at $c'$, for a purpose as will presently appear. It may be herein noted that the pin is removable from the shaft by tapping lightly on the headless end of the pin through the bottom of the aperture $a$.

The collar B is hollow, having a periphery $b$ and side flanges $b'$, whereby the same is substantially U-shaped in cross section, providing an interior annular way D. The flanges $b'$ are formed with central openings E for the reception of the shaft A, one of which is slightly enlarged, as at $d$, to permit the entrance of the head $c$ of the stop pin C. In the way D, and formed intermediate the flanges $b$ is a transversely disposed lug or wall F, against either side of which the head $c$ of the pin C is adapted to abut, dependent upon the manner of application of the collar and rotation of the shaft A. Near the opposite surfaces of the lug or wall F are springs G projecting into the path of the headed pin C, but allowing a sufficient space between the spring and the lug or wall to accommodate the head of the pin when forced beyond the spring. The purpose of the spring is perhaps apparent, but I may add that in applying the collar to the shaft, the enlarged opening D is alined with the headed pin C to permit the entrance of the head into the interior of the collar, and the collar is then turned over said pin until the head $c$ contacts one of the springs G, when the collar with a light force is turned still further beyond the spring into contact with the adjacent surface of the stop wall or lug. The spring prevents a return movement of the collar, thus insuring against the same rotating into accidental alinement with the head of the pin with a possible consequent separation from the shaft. The rotation of the shaft being always in a direction to force the head of the pin C against either one or the other surface of the lug or wall in the collar, the same cannot become detached, unless some force is applied to the collar to rotate the same in a reverse direction against and to overcome the spring G. This spring, of course, may be of any strength desired, but it is absolutely necessary only that it be sufficient to prevent the turning of the collar on the shaft when the shaft is still and which might otherwise be incident to any unbalanced state of the collar, owing to the formation and attachment of the devices on its interior.

By this construction, it will be appreciated that I have provided a collar which answers the purposes required of a device of this character; the same may be made at a trifling cost; it may be applied or removed with ease and quickness; and no projections, points, or sharp angles are provided which might catch upon the aprons, skirts, overalls, etc., of any persons standing near a running machine to which the device may be applied.

While I have herein illustrated one embodiment of my invention, it will be apparent that the invention may be embodied in other structures, differing both in matters of detail and arrangement from that disclosed.

I claim:

1. In combination with a shaft and a projecting part carried thereby, a collar for the shaft of substantially U-shape in cross-section forming a concentrically disposed annular way, and means on the interior of the collar between the side flanges thereof arranged to directly engage the projecting part carried by the shaft.

2. In combination with a shaft and a projecting part carried thereby, a collar for the shaft of substantially U-shape in cross-section forming an internal way, and means on said collar between the side flanges thereof arranged to engage the projecting part when turned in either direction in said way.

3. In combination with a shaft and a projecting part carried thereby, a collar for said shaft provided with a stop on its interior adapted to engage said projecting part, and means other than said engagement between the said stop and projecting part for normally preventing rotation of the collar in a direction opposite to its direction of engagement with the shaft.

4. In combination with a shaft and a projecting part carried thereby, a collar for the shaft provided with a stop on its interior adapted to engage said projecting part on the shaft, and means in the collar for normally preventing rotation thereof in a direction opposite to its direction of engagement with the shaft, said means comprising a spring arranged in the path of the projecting part of the shaft.

5. A collar of the character described having a hollow interior, a stop in said hollow interior, and a spring therein arranged near the stop, in combination with a shaft and a projecting part carried thereby arranged to coöperate with said stop and spring substantially as and for the purpose described.

6. A collar of the character described having a hollow interior, a stop in said hollow interior, and springs at opposite sides of the stop arranged near the same, in combination with a shaft and a projecting part carried thereby arranged to coöperate with said stop and springs substantially as and for the purpose described.

7. In combination with a shaft and a projecting part carried thereby, a collar for the shaft having a periphery and side flanges forming a way therein, and an abrupt wall in said way arranged to abut the projecting part carried by the shaft to cause them to rotate simultaneously.

8. A collar of the character described having a periphery and side flanges forming a way therein, and a stop in said way, in combination with a spring in said way arranged at a point separated some distance from said stop in combination with a shaft and a projecting part carried thereby arranged to coöperate with said stop and spring.

9. A collar of the character described having a periphery and side flanges forming a way therein, and a stop in said way, in combination with springs at the opposite sides of said stop arranged at separated points some distance from said stop in combination with a shaft and a projecting part carried thereby arranged to coöperate with said stop and springs.

10. In combination with a shaft and a projecting part carried thereby, a collar having on its interior a stop adapted to engage said projection in the rotation of the collar or shaft, and a spring normally preventing a reverse rotation of the collar.

11. In combination with a shaft and a projecting part carried thereby, a collar provided on its interior with a stop adapted to abut said projection in the rotation of the collar or shaft, said collar having side walls formed with openings for the reception of the shaft, and one of said openings being enlarged to permit the entrance of the projection on the shaft into the interior of the collar whereby said projection may rotate in the way formed in the collar between the periphery and said side walls thereof.

12. In combination with a shaft and a projecting part carried thereby, a collar provided on its interior with a stop adapted to abut said projection in the rotation of the collar or shaft, said collar having side walls formed with openings for the reception of the shaft, and one of said openings being enlarged to permit the entrance of the projection on the shaft into the interior of the collar, in combination with a spring arranged in the path of movement of the projection on the shaft adapted to normally prevent a reverse rotation of the collar.

13. In combination with a shaft, a projecting part carried thereby, a collar for the shaft having a peripheral portion and side flanges forming a way therein, the interior of the peripheral portion being arranged whereby not to contact with the projecting part on the shaft, and fixed means on the interior of the collar between the side flanges thereof arranged to operate in conjunction with the projecting part carried by the shaft to effect rotation of the collar with the shaft.

testimony whereof I affix my signature in presence of two witnesses.

GEORGE A. DONAHUE.

Witnesses:
   THOS. R. HEATH,
   JAS. H. MILANS.